US009134463B2

(12) United States Patent
Kim et al.

(10) Patent No.: US 9,134,463 B2
(45) Date of Patent: Sep. 15, 2015

(54) OPTICAL FILM HAVING IMPROVED OPTICAL PERFORMANCE, AND BACKLIGHT UNIT COMPRISING THE SAME

(75) Inventors: Byung-Mook Kim, Daegu (KR); Kwang-Seung Park, Daejeon (KR); Byung-Su Park, Daejeon (KR); Yune-Hyoun Kim, Daejeon (KR); Sang-Choll Han, Daejeon (KR); Jin-Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 384 days.

(21) Appl. No.: 13/809,864

(22) PCT Filed: Jul. 14, 2011

(86) PCT No.: PCT/KR2011/005183
§ 371 (c)(1),
(2), (4) Date: Feb. 1, 2013

(87) PCT Pub. No.: WO2012/008770
PCT Pub. Date: Jan. 19, 2012

(65) Prior Publication Data
US 2013/0121016 A1    May 16, 2013

(30) Foreign Application Priority Data

Jul. 15, 2010 (KR) .................. 10-2010-0068531
Nov. 26, 2010 (KR) .................. 10-2010-0118754

(51) Int. Cl.
*G02B 3/00* (2006.01)
*G02F 1/1335* (2006.01)

(52) U.S. Cl.
CPC ........ *G02B 3/0037* (2013.01); *G02F 1/133606* (2013.01)

(58) Field of Classification Search
CPC ..................................................... G02B 3/0037
USPC .................... 362/618, 619, 97.1; 359/709
See application file for complete search history.

(56) References Cited

U.S. PATENT DOCUMENTS

| 7,033,736 B2 | 4/2006 | Morris et al. |
| 7,545,460 B2 | 6/2009 | Arima et al. |
| 2004/0004770 A1 | 1/2004 | Ebina et al. |
| 2006/0204720 A1 | 9/2006 | Biernath et al. |
| 2007/0242478 A1 | 10/2007 | Arima et al. |
| 2007/0242479 A1 | 10/2007 | Ohta et al. |
| 2008/0316392 A1 | 12/2008 | Arima et al. |

(Continued)

FOREIGN PATENT DOCUMENTS

| JP | 2006-058802 | 3/2006 |
| JP | 2007-286261 | 11/2007 |

(Continued)

*Primary Examiner* — David V Bruce
(74) *Attorney, Agent, or Firm* — Dentons US LLP

(57) ABSTRACT

The present invention relates to an optical film having improved optical performance and to a backlight unit comprising the same. More particularly, the present invention relates to a microlens array (MLA) sheet which comprises a base unit and a lens unit formed on one side of the base unit, wherein the lens unit consists of a plurality of conical lenses. Existing hemispherical microlens array sheets have limitations in terms of improving luminance, and therefore cannot replace prism sheets in high luminance product s. However, the microlens array sheet consisting of conical lenses of the present invention can improve both luminance and viewing angle characteristics.

17 Claims, 3 Drawing Sheets

(56) References Cited

U.S. PATENT DOCUMENTS

| | | | |
|---|---|---|---|
| 2009/0225533 A1 | 9/2009 | Yamagishi et al. | |
| 2010/0060817 A1 | 3/2010 | Park et al. | |

FOREIGN PATENT DOCUMENTS

| | | | |
|---|---|---|---|
| JP | 2008268607 A | | 11/2008 |
| JP | 2009-258621 | | 11/2009 |
| JP | 2009-271346 | | 11/2009 |
| JP | 2009258621 A | * | 11/2009 |
| JP | 2010-040194 | | 2/2010 |
| JP | 2010-078692 | | 8/2010 |
| KR | 10-2007-0089200 | | 8/2007 |
| KR | 10-2008-0012252 | | 2/2008 |
| KR | 2008-0094054 A | | 10/2008 |
| KR | 1020090035373 A | | 4/2009 |
| KR | 10-2010-0030909 | | 3/2010 |
| KR | 1020100075217 A | | 7/2010 |
| TW | I240805 | | 10/2005 |
| TW | I314654 | | 9/2009 |
| WO | 2009/116458 | | 9/2009 |

* cited by examiner (a)

(b)

(c)

(a)

(b)

OPTICAL FILM HAVING IMPROVED OPTICAL PERFORMANCE, AND BACKLIGHT UNIT COMPRISING THE SAME

This application is a National Stage Entry of International Application No. PCT/KR2011/005183, filed Jul. 14, 2011, and claims the benefit of Korean Application Nos. 10-2010-0068531 filed on Jul. 15, 2010, and 10-2010-0118754 filed Nov. 26, 2010, all of which are hereby incorporated by reference in their entirety for all purposes as if fully set forth herein.

TECHNICAL FIELD

The present invention relates to an optical sheet and a backlight unit including the optical sheet, and more particularly, to a microlens array sheet having an enhanced optical performance and a backlight unit including an optical film having the microlens array sheet.

BACKGROUND ART

Liquid crystal display devices are electronic devices, which use variations in the transmissivity of liquid crystals according to voltage applied thereto to convert electrical information generated from various devices into visual information.

Liquid crystal display devices, which are small, lightweight, and economical in terms of power consumption, have largely replaced cathode ray tubes, and are in use in various data processing devices.

In such a liquid crystal display device, voltages are applied to a liquid crystal material to change specific molecular arrangements thereof. According to changes of the molecular arrangements, optical characteristics of the liquid crystal material also change, thereby displaying an image. The optical characteristics of the liquid crystal material include birefringence, optical rotatory power, dichroism, and light scattering.

As liquid crystal displays do not themselves produce light, they require a source of illumination in order to produce a visible image. To this end, backlight units may be used therefor.

Backlight units may be classified into edge-type backlight units and direct-type backlight units according to a position of a light emitting device therein. Edge-type backlight units include a light emitting device at a side of a light guide panel that guides light emitted from the lamp. Edge-type backlight units are used in small liquid crystal display devices such as the monitors of desktop and notebook computers, and provide even lighting and good durability. Moreover, the edge-type backlight units make possible the slimming of a device including the edge-type backlight unit. Meanwhile, the direct-type backlight units are used in 20-inch or larger display devices. Such a direct-type backlight unit includes lamps arrayed under a liquid crystal panel to directly illuminate the liquid crystal panel.

Linear light sources such as a cold cathode fluorescent lamp (CCFL) were previously widely used as light emitting devices in backlight units, but recently, linear light sources have increasingly been replaced with light emitting diodes (LEDs), which are slim, lightweight, economical in terms of power consumption, have excellent color reproducibility, and are environmentally sound.

A backlight unit may include a combination of optical films to diffuse or collect light emitted from a light source and improve the brightness and unevenness of the lighting thereof.

Brightness and viewing angle are important factors in evaluating image display devices such as liquid crystal display devices, and are largely determined by the performance of an optical sheet constituting a backlight unit. In recent years, hemisphere-shaped microlens array sheets have been widely used, but they have a limitation in improving brightness, and the brightness must be sacrificed in order to improve a viewing angle thereof.

Today, active research and development is being carried out into creating slim and lightweight backlight units. In particular, microlens array sheets are required to have optical performances such as high levels of brightness and wide viewing angles.

DISCLOSURE

Technical Problem

An aspect of the present invention provides a microlens array (MLA) sheet including conic lenses to improve the brightness and viewing angle thereof.

Another aspect of the present invention provides a backlight unit including the microlens array (MLA) sheet to improve optical performances thereof.

Technical Solution

According to an aspect of the present invention, there is provided a microlens array (MLA) sheet including a base and a lens part disposed on a surface of the base, wherein the lens part includes conic lenses that are determined by Equation 1 below, $$y = \frac{x^2/r}{1 + \sqrt{1 - (1+k)(1/r)^2 x^2}} \quad \text{Equation 1}$$

where k is a conic constant that ranges from −3 to −1, and r is a radius of curvature at a vertex of the conic lens.

The conic lens may include a hyperbola or a parabola in a central vertical cross-section thereof.

The conic lenses may have a pitch ranging from 10 μm to 500 μm.

A bottom surface of the conic lens may have a diameter ranging from 90% to 116% of a pitch of the conic lenses.

The radius of curvature at the vertex of the conic lens may range from 0.2% to 26% of a pitch of the conic lens.

The conic lenses may be uniformly arrayed.

According to an aspect of the present invention, there is provided a microlens array (MLA) sheet including a base and a lens part disposed on a surface of the base, wherein the lens part includes conic lenses that include a hyperbola or a parabola in a central vertical cross-section thereof.

The conic lenses may be uniformly arrayed.

According to an aspect of the present invention, there is provided a backlight unit including: light sources; and the microlens array sheet of any one of claims 1 to 8.

The microlens array sheet may be provided in duplicate, and the backlight unit may include the two microlens array sheets.

The backlight unit may include one of a direct-type backlight unit and an edge-type backlight unit.

Advantageous Effects

Since hemisphere-shaped microlens array sheets in the related art have a limitation in improving the brightness thereof, the hemisphere-shaped microlens array sheets cannot replace a prism sheet for a high brightness product. However, the microlens array sheets including the conic lenses according to the embodiments of the present invention have excellent brightness and viewing angle performances.

BEST MODE

Exemplary embodiments of the present invention will now be described in detail with reference to the accompanying drawings.

According to an embodiment of the present invention, an optical sheet includes conic-shaped unit lenses arrayed in a microlens array (MLA) on a light emitting surface. That is, a microlens array (MLA) sheet includes a base and a lens part placed on a surface of the base. The lens part includes conic lenses, each of which includes a hyperbola or a parabola as the central vertical cross-section thereof.

According to embodiments of the present invention, a conic lens may be any symmetrical lens, provided that the symmetrical lens includes a circular bottom surface and another surface including a hyperbola or a parabola in the central vertical cross section thereof. However, the conic lens is distinct from a cone-shaped lens having a triangle as the central vertical cross-section thereof, a hemisphere-shaped lens having a semicircle as the central vertical cross-section thereof, and an ellipse-shaped lens having an ellipse as the central vertical cross-section thereof.

The shape of the conic lens may be determined by the following equation, in which r denotes the radius of curvature at the vertex of the conic lens, and k denotes the conic constant. The shape of a curved surface constituting a lens may be expressed by a function with the conic constant k and the radius of curvature r at the vertex of the lens as variables. The conic constant k is a factor for determining the shape of a lens. If k=0, a lens has a circular shape. If k=−1, a lens has a parabola shape. If −1<k<0, a lens has an ellipse shape. If k<−1, a lens has a hyperbola shape.

$$y = \frac{x^2/r}{1 + \sqrt{1 - (1+k)(1/r)^2 x^2}}$$ Equation 1

Figure 1:
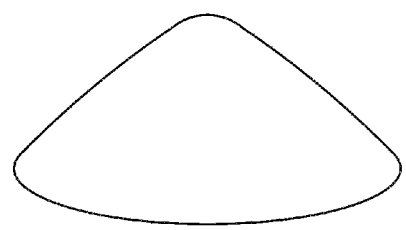
FIG. 1 is a schematic view illustrating (a) a conic lens, (b) hemisphere-shaped lens and (c) a cone-shaped lens constituting a microlens array sheet, according to an embodiment of the present invention.
Figure 1:
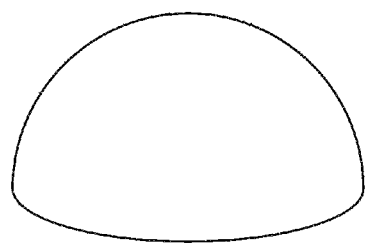
Figure 1:
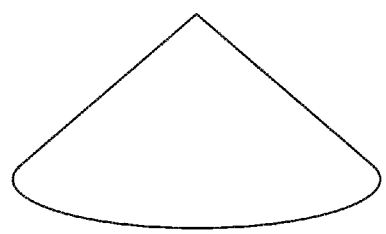

According to embodiments of the present invention, the conic constant k of a conic lens may be in a range from −3 to −1, preferably from −2.7 to −1.7, and more preferably, from −2.65 to −1.75. FIG. 1(a) is a schematic view illustrating a conic lens according to an embodiment of the present invention. FIGS. 1(b) and 1(c) are schematic views illustrating a hemisphere-shaped lens and a cone-shaped lens, respectively, which are distinct from a conic lens of the present invention. If the conic constant k is smaller than −3, a brightness performance of a lens may be degraded. If the conic constant k is greater than −1, an optical hiding performance as well as the brightness performance may be degraded.

Conic lenses according to the embodiment maybe arrayed with a predetermined pitch P on a surface of a microlens array sheet. The pitch P may be in a range preferably from 10 μm to 500 μm, and more preferably from 30 μm to 70 μm. If a pitch of lenses is smaller than 10 μm, the lenses may overlap each other to thereby degrade light-collecting efficiency, a mold fabrication may be difficult, and the lenses maybe susceptible to scratches. If a pitch of lenses is greater than 500 μm, gaps may be formed between the lenses to cause a loss of brightness, and the fabrication cost of a mold may increase. The above-described ranges of the pitch P according to the embodiment are determined to address various issues during a lens fabrication and a defective appearance such as a moire after the lens fabrication.

In addition, the shape of the conic lens may be determined by a diameter D of the bottom surface of the lens and a height H thereof. The diameter D may preferably be in a range from 90% to 116% of the pitch P, and more preferably from 92% to 116% of the pitch P, and most preferably from 98% to 116% of the pitch P. If the diameter D is smaller than 90% of the pitch P or greater than 116% thereof, the workability and yield of a film fabrication may decrease, and the brightness of the lenses may be degraded. Thus, when the lenses are disposed within the above-described ranges of the diameter D, a desired light-collecting efficiency can be attained.

The conic lenses may have various diameters within the above-described ranges of the diameter D, but the conic lenses may have the same diameter to facilitate lens fabrication and achieve uniform light emittance.

The conic lenses may have various heights within the above-described ranges of the height H, but the conic lenses may have the same height to facilitate lens fabrication and achieve uniform light emittance.

Figure 2:
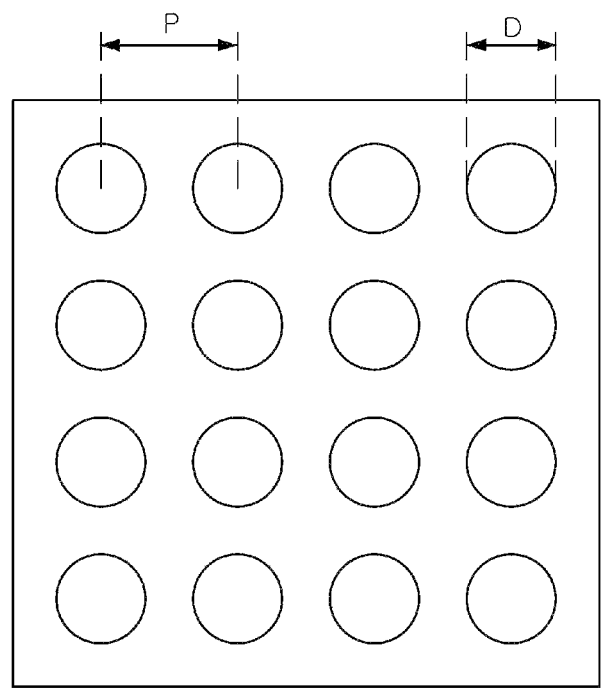
FIG. 2(a) is a plan view and (b) is a cross-sectional view illustrating a microlens array sheet according to an embodiment of the present invention.
Figure 2:
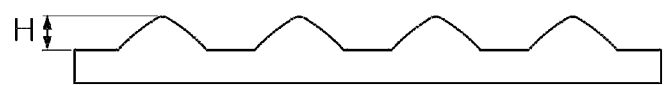

That is, the conic lenses may have various pitches within the above-described ranges of the pitch P and the above-described ranges of the diameter D, but the conic lenses may all have the same pitch. FIG. 2(a) is a plan view illustrating a microlens array sheet according to an embodiment of the present invention, and FIG. 2(b) is a cross-sectional view illustrating the microlens array sheet of FIG. 2(a), in which lenses are uniformly arrayed. However, arrangements of conic lenses according to the present invention are not limited to FIGS. 2(a) and 2(b). For example, conic lenses according to the present invention may be arrayed without gaps. In this case, the density of the amount of conic lenses may increase, and light-collecting efficiency using inclination surfaces of the lenses can be ensured.

The radius of curvature r at the vertex of the conic lens may preferably be in a range from 0.2% to 26% of the pitch P, more preferably from 0.2% to 24% of the pitch P, and most preferably from 0.2% to 22% of the pitch P. If the radius of curvature r is smaller than 0.2% of the pitch P, a defect may occur at the vertex of the lens during lens fabrication, the lens may be susceptible to a scratch, air bubbles may be formed in the lens, and a fabrication time may be increased. If the radius of curvature r is greater than 26% of the pitch P, the light-collecting efficiency, the optical hiding performance, and the brightness performance may be degraded.

A method of fabricating the microlens array sheet according to the embodiment of the present invention may be any well-known method in the art. For example, the conic lens according to the embodiment of the present invention may be fabricated by placing a lens-shaped intaglio mold on a base, injecting a thermosetting resin into the mold, and curing the thermosetting resin. Furthermore, an asymmetric bead arrangement method, a laser mask etching method, a direct tooling method, or a photolithography method may be used to fabricate the microlens array sheet.

The thermosetting resin used for fabricating the microlens array sheet according to the embodiment of the present invention may be one of urethane acrylate, epoxy acrylate, ester acrylate, a radical-generating monomer, and a combination thereof. Molds having various intaglios may be used to fabricate lenses having various shapes, heights, and pitches. Aside from the above-described methods, other well-known methods may be used to fabricate the microlens array sheet of the present invention.

According to an embodiment of the present invention, the microlens array sheet may be provided in plural, and a backlight unit may include at least one of the microlens array sheets.

Backlight units having the microlens array sheets include a direct-type backlight unit and an edge-type backlight unit.

That is, according to the embodiment of the present invention, a backlight unit includes light sources and at least one of the microlens array sheets over the light sources. Preferably, two or more of the microlens array sheets may be disposed over the light sources. More preferably, two of the microlens array sheets may be disposed over the light sources.

Figure 3:
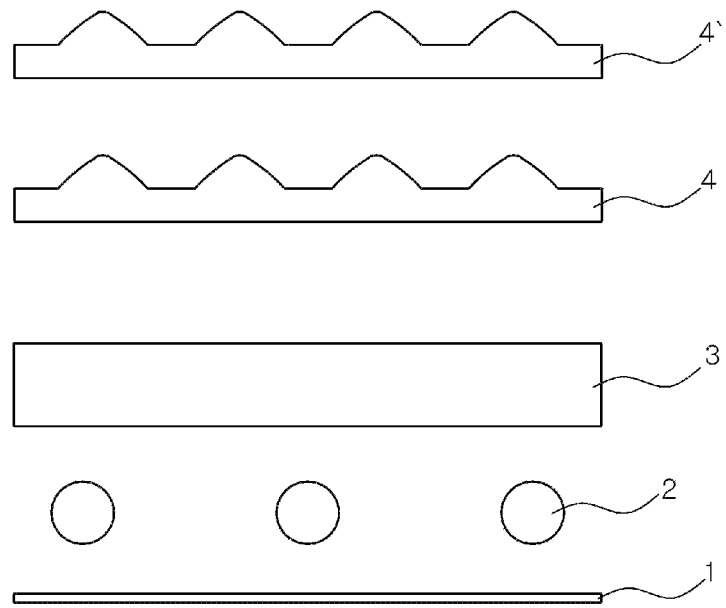
FIG. 3 is a view illustrating a backlight unit including microlens array sheets (4, 4') having conic lenses according to an embodiment of the present invention.

FIG. 3 is a schematic view illustrating a direct-type backlight unit according to an embodiment of the present invention. Referring to FIG. 3, the direct-type backlight unit may include: a reflective plate (1) reflecting otherwise wasted light back to a light emitting surface; linear light sources (2) spaced apart from one another at a constant distance; a diffuser plate or sheet (3) transforming the linear light sources to a surface light source and supporting optical films; and one or more microlens array sheets (4) and (4') including conic lenses and disposed over the diffuser plate or sheet.

The backlight unit may further include a diffuser film at the upper or lower side of the microlens array sheets, or include a light collecting film and a diffuser film, such as a prism film and a lenticular lens film, at the upper or lower side of the microlens array sheets.

The backlight unit can have wide viewing angle and high brightness performance.

Hereinafter, exemplary embodiments of the present invention will now be described in more detail, but the present invention is not limited thereto.

MODE FOR INVENTION

Embodiment

1. Fabrication of Microlens Array Sheet
Embodiment 1: Microlens Array Sheet Including Conic Lenses A microlens array sheet was fabricated using a laser mask method. The diameter D was 55 μm. The radius of curvature r at the vertex of a conic lens was 5.5 μm. The conic constant k was −2.15. The pitch P was 50 μm.

Comparative Example 1: Microlens Array Sheet Including Cone-shaped Lenses

A microlens array sheet was fabricated in the same manner as that of embodiment 1, except that cone-shaped lenses having a vertical angle of 90° were arrayed thereon and the diameter D was 50 μm and the pitch P was 50 μm.

Comparative Example 2: Microlens Array Sheet Including Hemisphere-shaped Lenses

A microlens array sheet was fabricated in the same manner as that of embodiment 1, except that hemisphere-shaped lenses having a conic constant of 0 were arrayed and the diameter D was 50 μm and the pitch P was 50 μm and the radius of curvature r at the vertex of the hemisphere-shaped lens was 25 μm.

Embodiments 2 to 9, and Comparative Examples 3 to 20

Microlens array sheets were fabricated in the same manner as that of the embodiment 1 by varying the pitch P, the diameter D, the radius of curvature r, and the conic constant k, as shown in the table below.

2. Comparison of Brightness Performances According to Lens Shapes

Each of the microlens array sheets fabricated as described above was provided in duplicate to perform an optical simulation. Here, light emitting diodes of a 22-inch edge-type backlight unit were used for input values, and a receiver was disposed over the two same microlens array sheets to compare viewing angle data according to brightness. Simulation results are shown in the table 1.

In the table 1, the brightness of light incident to an optical film is set to 100%, and a ratio of the maximum brightness of light transmitted by the microlens array sheet to the brightness of the light incident to the optical film is expressed in %.

TABLE 1

| | RADIUS OF CURVATURE (r) | CONIC CONSTANT (k) | DIAMETER (D) | PITCH (P) | BRIGHTNESS |
|---|---|---|---|---|---|
| UNIT | μm | μm | μm | μm | % |
| EMBODIMENT 1 | 5.5 | −2.15 | 55 | 50 | 100 |
| COMPARATIVE EX 1 | 0.01 | −2 | 50 | 50 | 85 |
| COMPARATIVE EX 2 | 25 | 0 | 50 | 50 | 84 |
| COMPARATIVE EX 3 | 12 | −2.15 | 55 | 50 | 85 |
| COMPARATIVE EX 4 | 5.5 | −4 | 55 | 50 | 83 |
| COMPARATIVE EX 5 | 5.5 | −2.15 | 30 | 50 | 72 |
| COMPARATIVE EX 6 | 5.5 | −2.15 | 80 | 50 | 85 |
| COMPARATIVE EX 7 | 5.5 | −2.15 | 55 | 25 | 69 |
| COMPARATIVE EX 8 | 5.5 | −2.15 | 55 | 75 | 80 |
| COMPARATIVE EX 9 | 5.5 | −0.9 | 55 | 30 | 72 |
| EMBODIMENT 2 | 1.3 | −2.1 | 10 | 10 | 93 |
| EMBODIMENT 3 | 5.2 | −2 | 41 | 40 | 92 |
| EMBODIMENT 4 | 9 | −2 | 72 | 70 | 94 |
| EMBODIMENT 5 | 63 | −2 | 515 | 500 | 94 |
| EMBODIMENT 6 | 5.5 | −1 | 55 | 50 | 90 |
| EMBODIMENT 7 | 5.5 | −3 | 55 | 50 | 93 |

TABLE 1-continued

|  | RADIUS OF CURVATURE (r) | CONIC CONSTANT (k) | DIAMETER (D) | PITCH (P) | BRIGHTNESS |
|---|---|---|---|---|---|
|  | UNIT | | | | |
|  | μm | μm | μm | μm | % |
| EMBODIMENT 8 | 5.5 | −1.5 | 55 | 50 | 92 |
| EMBODIMENT 9 | 5.5 | −2.5 | 55 | 50 | 95 |
| COMPARATIVE EX 10 | 5.5 | −2.15 | 30 | 50 | 76 |
| COMPARATIVE EX 11 | 50 | −2.15 | 55 | 50 | 67 |
| COMPARATIVE EX 12 | 5.5 | −5 | 55 | 50 | 66 |
| COMPARATIVE EX 13 | 1.3 | −2.1 | 30 | 10 | 66 |
| COMPARATIVE EX 14 | 10 | −2.1 | 10 | 10 | 50 |
| COMPARATIVE EX 15 | 1.3 | −1.1 | 10 | 10 | 62 |
| COMPARATIVE EX 16 | 63 | −2 | 220 | 500 | 66 |
| COMPARATIVE EX 17 | 200 | −2 | 515 | 500 | 59 |
| COMPARATIVE EX 18 | 63 | −4 | 515 | 500 | 63 |

As shown in the table 1, the microlens array sheets including the conic lenses according to the embodiments are improved in brightness performance with respect to viewing angle in comparison to the microlens array sheets including the hemisphere-shaped lenses and the cone-shaped lenses in comparative examples 1 and 2.

Furthermore, as shown in the table 1, the lenses disposed in the above-described ranges of the pitch P and the conic constant k according to the embodiment are improved in brightness performance in comparison to the lenses disposed outside of the above-described ranges of the pitch P and the conic constant k.

In particular, the microlens array sheets in the embodiments significantly improved in brightness performance in comparison to the microlens array sheets including ellipse lenses (k=0.9) in comparative example 9.

3. Comparison of Brightness Performances According to Sheet Arrangement of the Present Invention To compare brightness performances according to an arrangement of microlens array sheets of the present invention, the brightness performances of one microlens array sheet, two microlens array sheets, and three microlens array sheets were compared to one another.

To this end, an optical simulation was performed. Here, light emitting diodes of a 22-inch edge-type backlight unit were used for input values, and a receiver was disposed over two microlens array sheets to compare viewing angle data according to brightness. Simulation results are illustrated in FIG. 4.

Figure 4:
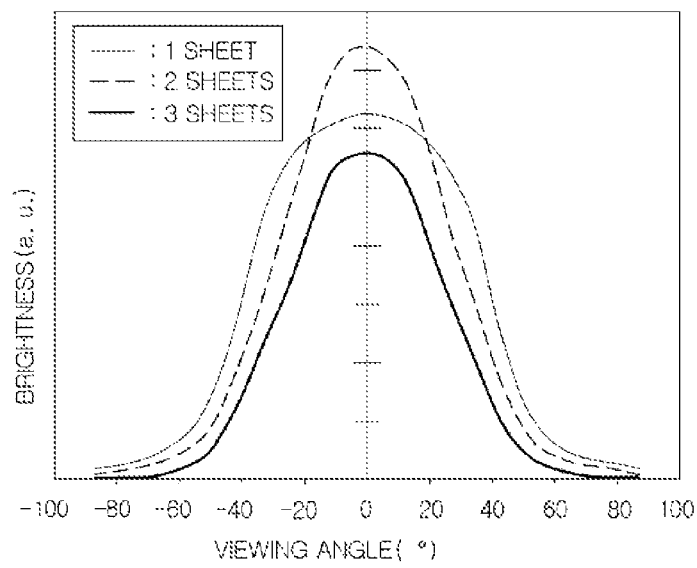
FIG. 4 is a graph illustrating brightness performances of one, two, and three microlens array sheets according to an embodiment of the present invention.

Referring to FIG. 4, the brightness performance of the two microlens array sheet is better than that of the one or three microlens array sheets.

Therefore, when the lens shapes of a microlens array sheet satisfy the ranges of the pitch P, the diameter D, the radius of curvature r, and the conic constant k according to the embodiment, and especially, when two microlens array sheets are used, the brightness performance thereof can be significantly enhanced.

[Sequence List Text]

P: pitch of the conic lens
D: diameter of bottom surface of the conic lens
H: height of the conic lens
1: reflective plate
2: light sources
3: diffuser plate
4, 4': microlens array sheet of present invention

The invention claimed is:

1. A microlens array (MLA) sheet comprising a base and a lens part disposed on a surface of the base,
wherein the lens part comprises conic lenses that are determined by Equation 1 below, $$y = \frac{x^2/r}{1+\sqrt{1-(1+k)(1/r)^2 x^2}} \qquad \text{Equation 1}$$

where k is a conic constant that ranges from −3 to −1, and r is a radius of curvature at a vertex of the conic lens.

2. The microlens array sheet of claim 1, wherein k is a conic constant that ranges from −2.7 to −14.7.

3. The microlens array sheet of claim 1, wherein k is a conic constant that ranges from −2.65 to −1.75.

4. The microlens array sheet of claim 1, wherein the conic lens comprises a hyperbola or a parabola in a central vertical cross-section thereof.

5. The microlens array sheet of claim 1, wherein the conic lenses have a pitch ranging from 10 μm to 500 μm.

6. The microlens array sheet of claim 1, wherein a bottom surface of the conic lens has a diameter ranging from 90% to 116% of a pitch of the conic lenses.

7. The microlens array sheet of claim 1, wherein a bottom surface of the conic lens has a diameter ranging from 92% to 116% of a pitch of the conic lenses.

8. The microlens array sheet of claim 1, wherein a bottom surface of the conic lens has a diameter ranging from 98% to 116% of a pitch of the conic lenses.

9. The microlens array sheet of claim 1, wherein the radius of curvature at the vertex of the conic lens ranges from 0.2% to 26% of a pitch of the conic lens.

10. The microlens array sheet of claim 1, wherein the radius of curvature at the vertex of the conic lens ranges from 0.2% to 24% of a pitch of the conic lens.

11. The microlens array sheet of claim 1, wherein the radius of curvature at the vertex of the conic lens ranges from 0.2% to 22% of a pitch of the conic lens.

12. The microlens array sheet of claim 1, wherein the conic lenses are uniformly arrayed.

13. A microlens array (MLA) sheet comprising a base and a lens part disposed on a surface of the base,
   wherein the lens part comprises conic lenses that comprises a hyperbola or a parabola in a central vertical cross-section thereof, and
   wherein the conic lenses have a pitch ranging from 10 μm to 500 μm.

14. The microlens array sheet of claim 13, wherein the conic lenses are uniformly arrayed.

15. A backlight unit comprising:
   light sources; and
   the microlens array sheet of claim 1.

16. The backlight unit of claim 15, wherein the microlens array sheet is provided in duplicate, and the backlight unit comprises the two microlens array sheets.

17. The backlight unit of claim 15, wherein the backlight unit comprises one of a direct-type backlight unit and an edge-type backlight unit.

* * * * *